(12) United States Patent
Oda et al.

(10) Patent No.: US 11,843,101 B2
(45) Date of Patent: Dec. 12, 2023

(54) BATTERY PACK

(71) Applicant: Vehicle Energy Japan Inc., Hitachinaka (JP)

(72) Inventors: Masanari Oda, Tokyo (JP); Hirofumi Takahashi, Tokyo (JP); Shigeki Makino, Tokyo (JP); Wataru Sato, Tokyo (JP); Hitoshi Nishimori, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 0 days.

(21) Appl. No.: 17/485,870

(22) Filed: Sep. 27, 2021

(65) Prior Publication Data

US 2022/0013829 A1    Jan. 13, 2022

Related U.S. Application Data

(63) Continuation of application No. 16/333,957, filed as application No. PCT/JP2018/008369 on Mar. 5, 2018, now Pat. No. 11,133,541.

(30) Foreign Application Priority Data

Mar. 29, 2017   (JP) ................................ 2017-064157

(51) Int. Cl.
*H01M 10/6555*   (2014.01)
*H01M 10/613*    (2014.01)
(Continued)

(52) U.S. Cl.
CPC ..... *H01M 10/6555* (2015.04); *H01M 10/613* (2015.04); *H01M 10/647* (2015.04);
(Continued)

(58) Field of Classification Search
CPC .......................... H01M 50/547; H01M 50/543
See application file for complete search history.

(56) References Cited

U.S. PATENT DOCUMENTS

2002/0012833 A1   1/2002  Gow
2003/0232239 A1  12/2003  Gow
(Continued)

FOREIGN PATENT DOCUMENTS

EP   1 583 170 A2   10/2005
EP   3 570 364 A1   11/2019
(Continued)

OTHER PUBLICATIONS

International Search Report (PCT/ISA/210) issued in PCT Application No. PCT/JP2018/008369 dated Apr. 3, 2018 with English translation (five pages).
(Continued)

*Primary Examiner* — Matthew J Merkling
(74) *Attorney, Agent, or Firm* — Crowell & Moring LLP

(57) ABSTRACT

Provided is a battery pack including: a first battery group in which a plurality of storage batteries having a battery can side surface and a battery can bottom surface linked to the battery can side surface are laminated so that the battery can side surfaces face each other; a second battery group in which a plurality of storage batteries having a battery can side surface and a battery can bottom surface linked to the battery can side surface are laminated so that the battery can side surfaces are face each other; and a case housing the first battery group and the second battery group, wherein the facing surfaces of the first battery group and the second battery group are directly or indirectly thermally connected to each other.

7 Claims, 15 Drawing Sheets

(51) Int. Cl.
*H01M 10/647* (2014.01)
*H01M 10/653* (2014.01)
*H01M 10/656* (2014.01)
*H01M 10/6554* (2014.01)
*H01M 50/543* (2021.01)
*H01M 50/547* (2021.01)
*H01M 50/289* (2021.01)
*H01M 50/211* (2021.01)
*H01M 10/625* (2014.01)

(52) U.S. Cl.
CPC ....... *H01M 10/653* (2015.04); *H01M 10/656* (2015.04); *H01M 10/6554* (2015.04); *H01M 50/211* (2021.01); *H01M 50/289* (2021.01); *H01M 50/543* (2021.01); *H01M 50/547* (2021.01); *H01M 10/625* (2015.04)

(56) References Cited

U.S. PATENT DOCUMENTS

| | | |
|---|---|---|
| 2004/0201366 A1 | 10/2004 | Kimoto et al. |
| 2007/0026300 A1 | 2/2007 | Lee |
| 2007/0026301 A1 | 2/2007 | Lee |
| 2009/0142650 A1 | 6/2009 | Okada |
| 2010/0028761 A1* | 2/2010 | Bielawski ......... H01M 10/4285 429/93 |
| 2010/0151307 A1 | 6/2010 | Naganuma |
| 2010/0266887 A1* | 10/2010 | Sekino ................ H01M 50/507 429/123 |
| 2010/0285347 A1 | 11/2010 | Saito |
| 2011/0151298 A1 | 6/2011 | Kim |
| 2011/0200862 A1 | 8/2011 | Kurosawa |
| 2012/0018238 A1 | 1/2012 | Mizoguchi |
| 2014/0011059 A1 | 1/2014 | Hashimoto et al. |

FOREIGN PATENT DOCUMENTS

| | | |
|---|---|---|
| JP | 2000-164186 A | 6/2000 |
| JP | 2003-249205 A | 9/2003 |
| JP | 2003-331812 A | 11/2003 |
| JP | 2011-171029 A | 9/2011 |
| JP | 2013-125612 A | 6/2013 |
| JP | 2013-243079 A | 12/2013 |
| JP | 2014-127342 A | 7/2014 |
| JP | 2014-203747 A | 10/2014 |
| JP | 2014-222593 A | 11/2014 |
| JP | 5630431 B2 | 11/2014 |
| JP | 5835098 B2 | 12/2015 |
| JP | 5933344 B2 | 6/2016 |
| JP | 2017-41378 A | 2/2017 |
| WO | WO 2012/133707 A1 | 10/2012 |

OTHER PUBLICATIONS

Japanese-language Written Opinion (PCT/ISA/237) issued in PCT Application No. PCT/JP2018/008369 dated Apr. 3, 2018 (four pages).
Japanese-language Written Opinion (PCT/IPEA/408) issued in PCT Application No. PCT/JP2018/008369 dated Feb. 19, 2019 (five pages).
Extended European Search Report issued in European Application No. 18776356.0 dated Nov. 27, 2020 (seven (7) pages).
Japanese-language Office Action issued in Japanese Application No. 2021-070680 dated Jul. 6, 2021 (two (2) pages).
Japanese-language Office Action issued in Japanese Application No. 2021-045251dated Jul. 6, 2021 (three (3) pages).
U.S. Non-Final Office Action issued in U.S. Appl. No. 17/485,823 dated Nov. 4, 2022 (nine (9) pages).
United States Final Office Action issued in U.S. Appl. No. 17/485,823 dated Mar. 28, 2023 (12 pages).
U.S. Non-Final Office Action issued in U.S. Appl. No. 17/485,823 dated Oct. 13, 2023 (12 pages).

* cited by examiner

FIG. 2
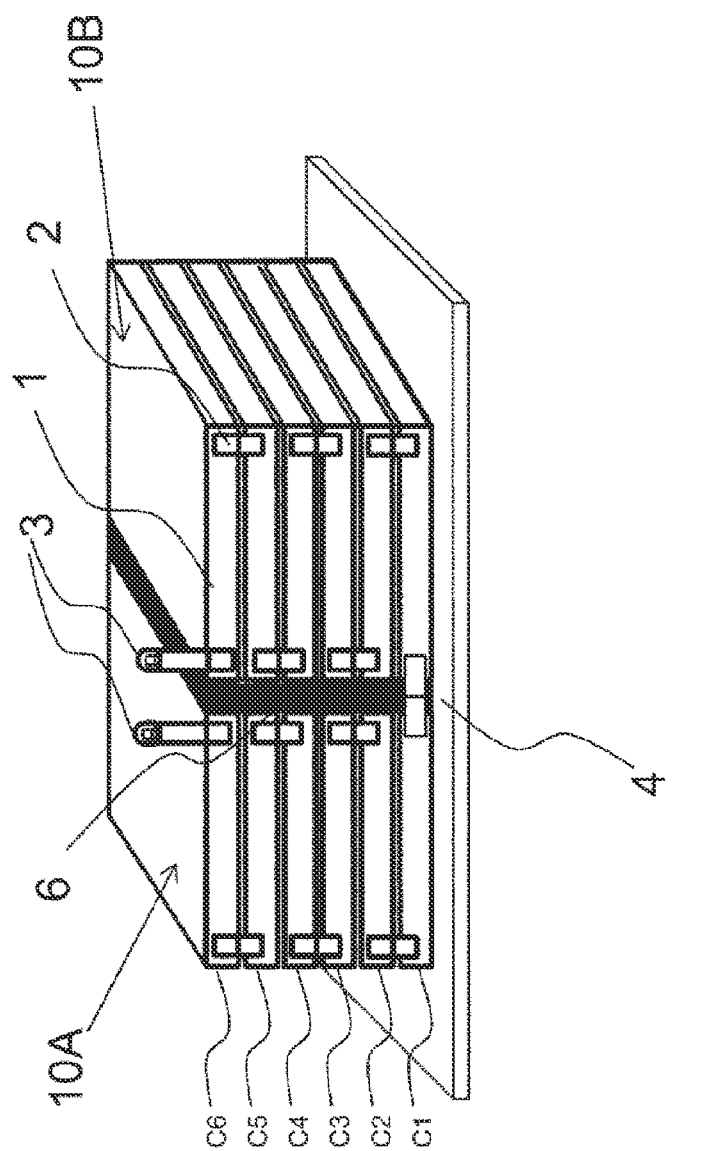
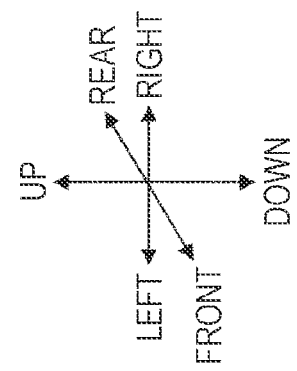

BATTERY PACK

CROSS REFERENCE TO RELATED APPLICATIONS

This application is a Continuation of U.S. application Ser. No. 16/333,957, filed Mar. 15, 2019, which is a Continuation Application of PCT Application No. PCT/JP2018/008369, filed Mar. 5, 2018, which claims priority to Japanese Patent Application No. 2017-064157, filed Mar. 29, 2017, the entire content of which is incorporated herein by reference.

TECHNICAL FIELD

The present invention relates to a battery pack.

BACKGROUND ART

Recently, a demand for an in-vehicle secondary battery has increased against the background of environmental regulations. Among the secondary batteries, since a lithium ion secondary battery usually has a high discharge potential as compared with a lead battery, a nickel hydrogen battery, or the like, the lithium ion secondary battery can be miniaturized or have a higher energy density, and thus, is considered as being promising. For example, further higher energy density, higher output density, longer life, and the like are required for the lithium ion secondary battery for real application. For higher output of a battery, it is effective to input and output a large current from the battery as well as higher potential. However, when a large current is input and output from a battery, heat derived from internal resistance of the battery is produced inside the battery. When the produced heat is not sufficiently removed from the battery, battery temperature is raised. Battery characteristics such as battery capacity or internal resistance of a lithium ion battery have a different deterioration trend depending on a battery temperature, and particularly when the battery temperature is higher, the battery characteristics are often lowered. Thus, development of a technology to improve heat dissipation performance of a battery is needed.

When a plurality of lithium ion unit cells (hereinafter, referred to as unit cells) is combined and used as a battery group (for example, used as a battery module or a battery pack), it is desired to decrease a temperature difference between unit cells of the battery group. This is because when the temperature difference between the unit cells is large, a difference in deterioration between the unit cells easily occurs. Since the characteristics of the battery group tend to be rate-determined by the characteristics of the most deteriorated cell among the unit cells included in the battery group, design of the battery group avoiding a structure in which a specific cell is deteriorated is needed.

Thus, a technology in which in a battery group formed by combining a plurality of unit cells, a temperature difference between unit cells is decreased is being developed. Specifically, PTL 1 discloses a storage battery in which an electrolytic bath housing a unit cell is formed of a cuboid composed of a short side having a narrow width and a long side having a wide width, and a plurality of unit cells is linked so as to be adjacent to each other between the short sides of the electrolytic bath to form an aggregate battery having a required power capacity.

Meanwhile, when a large current is input and output from a battery, a cross-sectional area of a cable connected to the battery is needed to be increased. As a material used in the cable, a metal represented by copper is used, however, the metal has a high thermal conductivity, and thus, has high heat dissipation performance.

CITATION LIST

Patent Literature

PTL 1: JP 2000-164186 A

SUMMARY OF INVENTION

Technical Problem

In the technology described in PTL 1, a plurality of ribs is formed on a long side of an electrolytic bath of each unit cell. Then, air and the like are forcibly flowed between the ribs to cool the unit cell. In this configuration, when cooling efficiency is decreased (for example, a flow rate of forcibly flowed air is small, or an input/output current is large and a heating value of the unit cell is large), a battery temperature distribution occurs in a battery group to be configured, and particularly, a battery temperature of the unit cell disposed near a center of the long side of the battery group is high, so that there is a risk of deterioration progression. The present invention has been made in view of the above problem, and an object of the present invention is to provide a battery pack having a small temperature difference between battery groups.

Solution to Problem

A battery pack of an embodiment of the present invention includes a first battery group in which a plurality of storage batteries having a battery can side surface and a battery can bottom surface linked to the battery can side surface are laminated so that the battery can side surfaces face each other; a second battery group in which a plurality of storage batteries having a battery can side surface and a battery can bottom surface linked to the battery can side surface are laminated so that the battery can side surfaces face each other; and a case housing the first battery group and the second battery group, wherein the facing surfaces of the first battery group and the second battery group are directly or indirectly thermally connected to each other.

Advantageous Effects of Invention

According to the invention, a battery pack having a small temperature difference between battery groups can be provided.

BRIEF DESCRIPTION OF DRAWINGS

FIG. 2 is a drawing for describing an example of a specific configuration of a battery group in Example 2.

DESCRIPTION OF EMBODIMENTS

Figure 1:
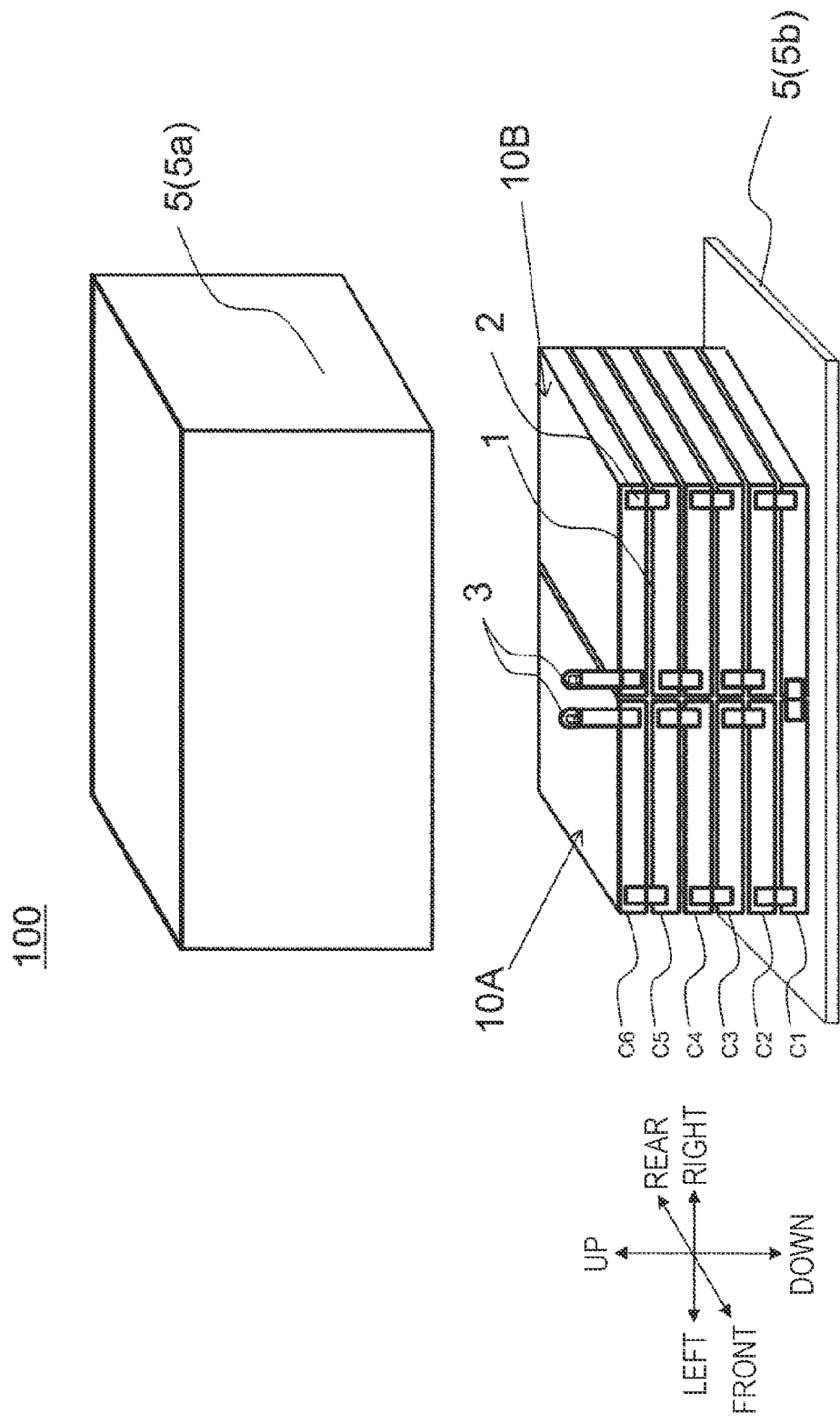
FIG. 1 is a drawing for describing an example of a specific configuration of a battery group in Example 1.
Figure 3:
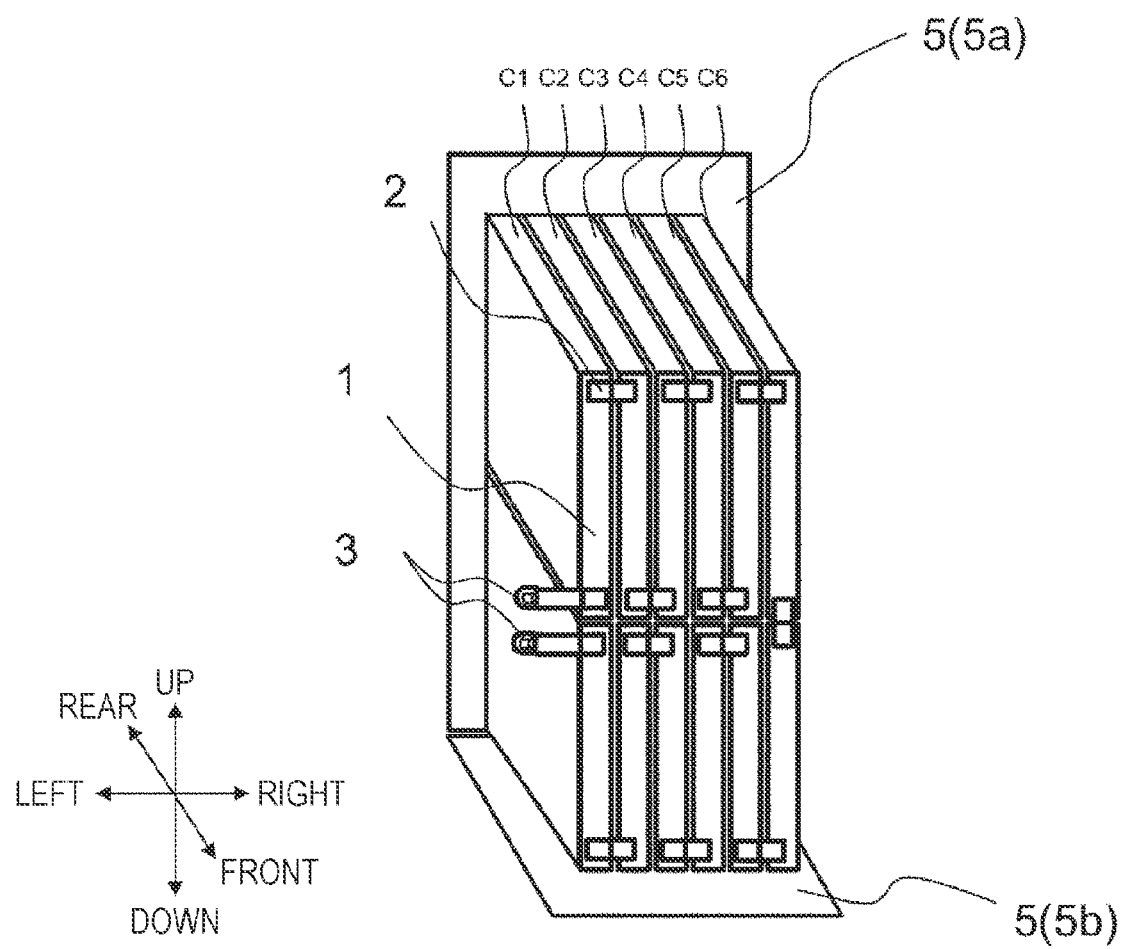
FIG. 3 is a drawing for describing an example of a specific configuration of a battery group in Example 5.
Figure 4:
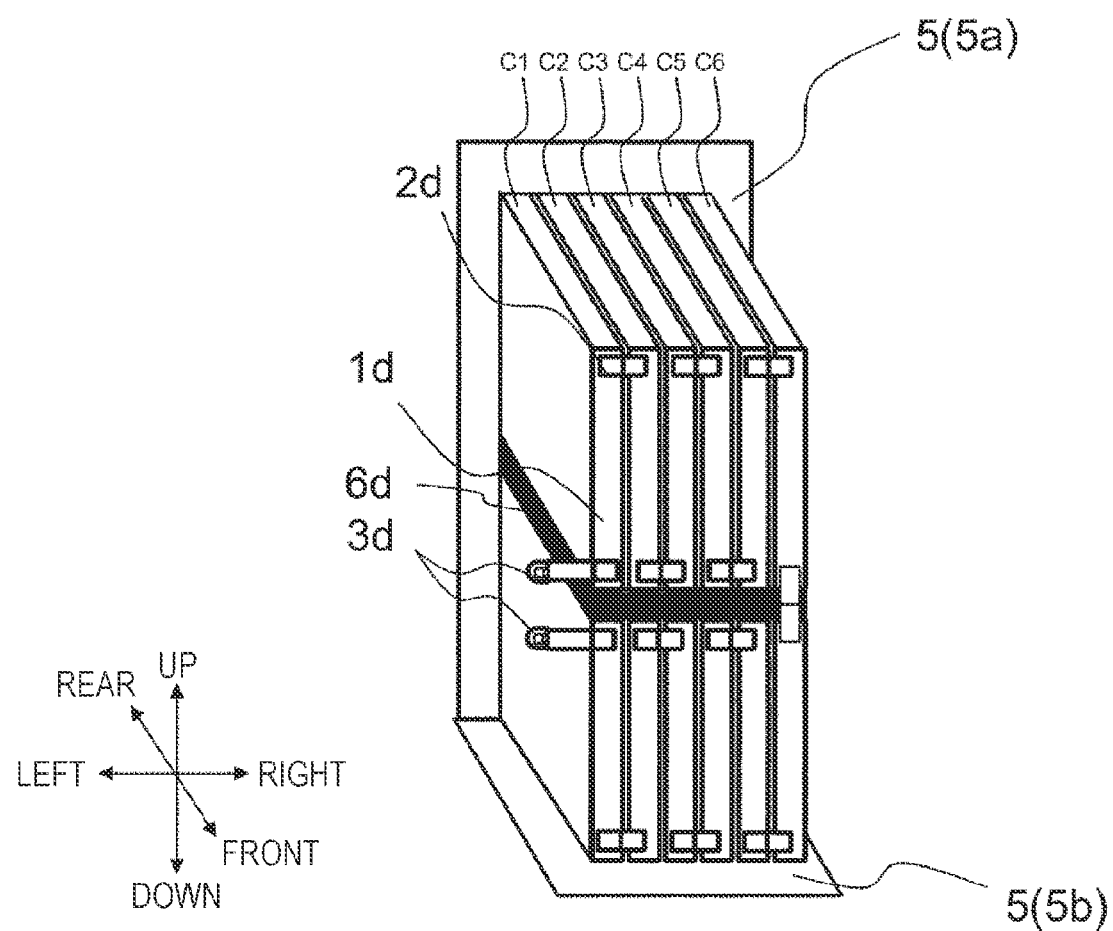
FIG. 4 is a drawing for describing an example of a specific configuration of a battery group in Example 6.
Figure 5:
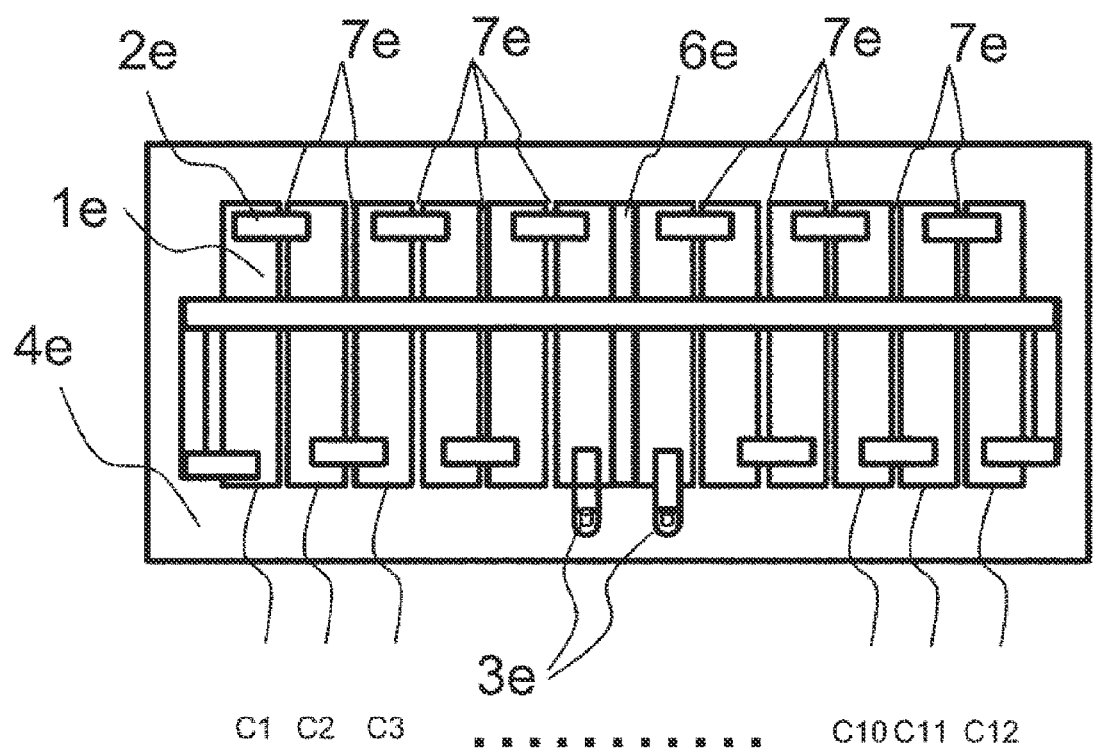
FIG. 5 is a drawing for describing an example of a specific configuration of a battery group in Example 7.

Embodiments of the present invention will be described. However, the embodiments do not limit the following descriptions, and can be optionally modified and carried out within the range not departing from the gist of the present invention.

The present embodiments will be described in detail. As a secondary battery in the present embodiment, a lithium ion secondary battery is used; however, the present configuration can be also applied to other types of storage battery. In addition, the effect can be obtained with any constituent member of the lithium ion secondary battery. That is, in the present invention, an electrode composed of an Al current collector foil and a positive electrode material having a layered structure as a positive electrode, and an electrode composed of a Cu current collector foil and a carbon material as a negative electrode are used, but other configurations may be also used. For example, as described in Examples 3 and 4, heat dissipation properties may be improved even in the case of using an Al foil in the negative electrode. A cooling environment is an example, and it can be applied also to the case of using other refrigerants. In addition, as a shape of the lithium ion battery, a rectangular battery was used in the present Example; however, the effect can be obtained even with the battery known as having other shapes, for example, a laminate type, a cylindrical shape, or the like.

When unit cells are used as a battery group, the unit cells are connected to each other in series or in parallel. In this case, for guaranteeing safety, a member capable of securing insulation between batteries may be introduced around the unit cell, for example, as shown in Example 7. The shape of the member is free and the material can be freely selected; however, it is preferred to include a heat transfer member. When the unit cells are connected to each other in series or in parallel, wiring to be used is not particularly limited; however, for example, a bus bar can be used. Whatever the form of serial or parallel connection is, the effect is exhibited when the battery arrangement and the configuration of an external terminal according to the present invention are used. For example, even with a battery group in which six battery groups having two parallel parts are arranged in series, the effect of the present invention is obtained. In addition, it is preferred that in the battery group, in addition to electrically connecting the unit cells to each other in series or in parallel, the unit cells are physically bound to each other using a fixing jig. However, the present invention is not limited to the binding method. For example, the effect was exhibited even when two battery groups are secured using a set of fixing jigs or secured using two sets of securing jigs.

In the present invention, the battery pack is configured using a first battery group and a second battery group which are connected by the above-described means as a basic configuration, and in addition to them, the battery pack may be provided with a control device of a battery (for example, a Battery Management System; BMS or the like can be used) or a safety mechanism (for example, a fuse or the like), and even in the case of connecting them to wiring in the battery group, the effect of the present invention is obtained.

A method of contacting a case bottom surface with the battery group is not particularly limited and the effect of the present invention is exhibited even with for example, adhesion with an adhesive or the like or connection through a fixture using bolts or nuts. The shape of the case is exemplified by a cuboid in the present embodiment, however, the shape is not particularly limited. In addition, the effect of the present invention is not limited to a current application condition to the battery pack or a cooling condition.

Hereinafter, the present invention will be described in detail, based on the Examples and the Comparative Examples. FIG. 1 is an exploded perspective view of a battery pack 100 of the present invention. In addition, when up, down, left, right, front, or rear is referred to in the following description, it follows the directions as indicated in the lower left in each drawing.

The battery pack 100 is composed of a first battery group 10A, a second battery group 10B, and a case 5 (5*a*, 5*b*) housing the first battery group 10A and the second battery group 10B. The case 5 is composed of a case 5*a* and a cover 5*b* covering a case opening. In addition, in the present embodiment, a bottom surface 5*b* is provided as an additional member; however, a structure in which the case 5*a* is provided with a bottom surface and has an opening on an upper surface, and a cover 5*b* is disposed on the upper surface may be also used.

Figure 15:
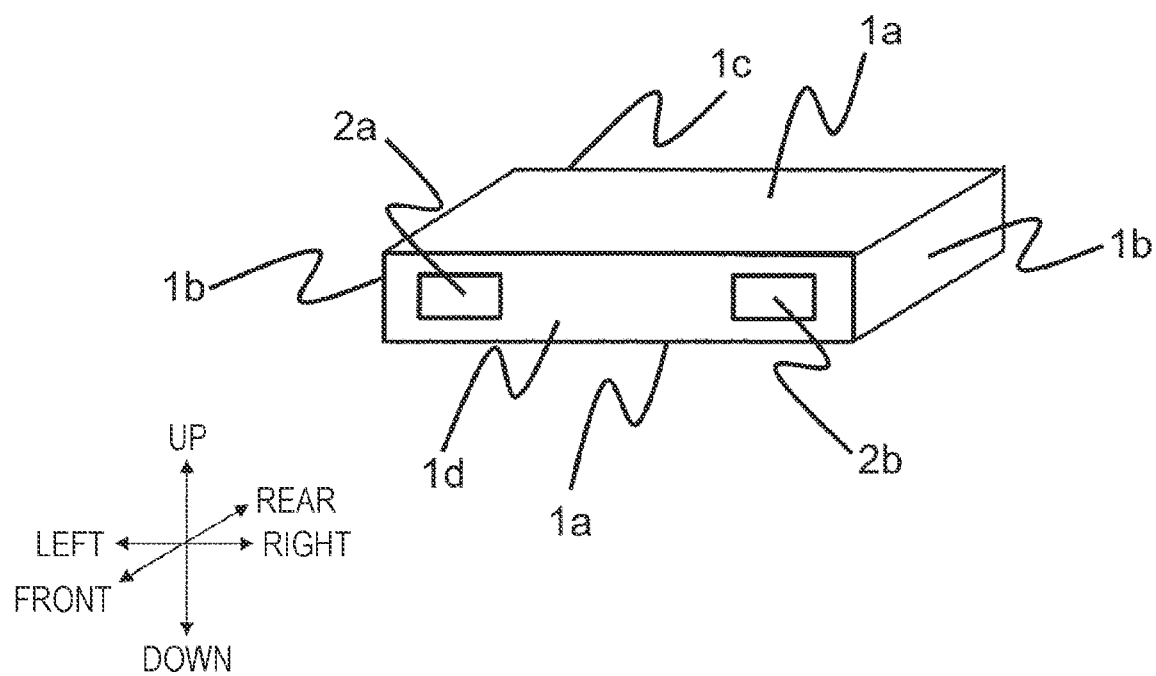
FIG. 15 is a perspective view of the secondary battery of the present invention.

FIG. 15 is a drawing representing a storage battery 1 used in the present invention. The storage battery 1 is composed of a pair of wide surfaces 1*a*, a pair of narrow surfaces 1*b*, a bottom surface 1*c*, and a cover 1*d*. The cover 1*d* is provided with a positive electrode external terminal 2*a* and a negative electrode external terminal 2*b*.

Referring back to FIG. 1, the first battery group 10A and the second battery group 10B are described, respectively. The first battery group 10A is formed by laminating a plurality of the storage batteries 1 (in the present embodiment, six storage batteries) so that the wide surfaces 1*a* of the storage battery 1 face each other. For the second battery group 10B also, like the first battery group 10A, a structure is formed by laminating the storage batteries so that the wide surfaces of the storage battery face each other.

The storage batteries 1 constituting the first battery group 10A are connected to each other in series by a bus bar 2. In addition, like the second battery group 10B, the storage batteries 1 are connected to each other in series by the bus bar 2. In addition, a structure in which the storage battery 1 on a bottom surface 5*b* side of the first battery group 10A and the storage battery 1 on a bottom surface 5*b* side of the second battery group 10B no are connected to each other by the bus bar 2 is formed. Further, each of the two battery groups 10A and 10B has an external terminal 3 which is connected to other electronic components (for example, a junction box or the like) housed in the battery pack 100, disposed on the upper center side of the battery pack 100. In the present invention, a temperature change of the battery pack 100 was measured by some settings (FIGS. 1 to 7).

EXAMPLE 1

First, Example 1 is described. A first battery group and a second battery group were horizontally arranged as shown in FIG. 1 and then thermally directly connected, and a HV cable made of copper having a diameter of 95 mm was installed at the end of a positive electrode external terminal and a negative electrode external terminal and a current was applied thereto. A heating value from the battery at that time was 3 W on average.

Figure 8:
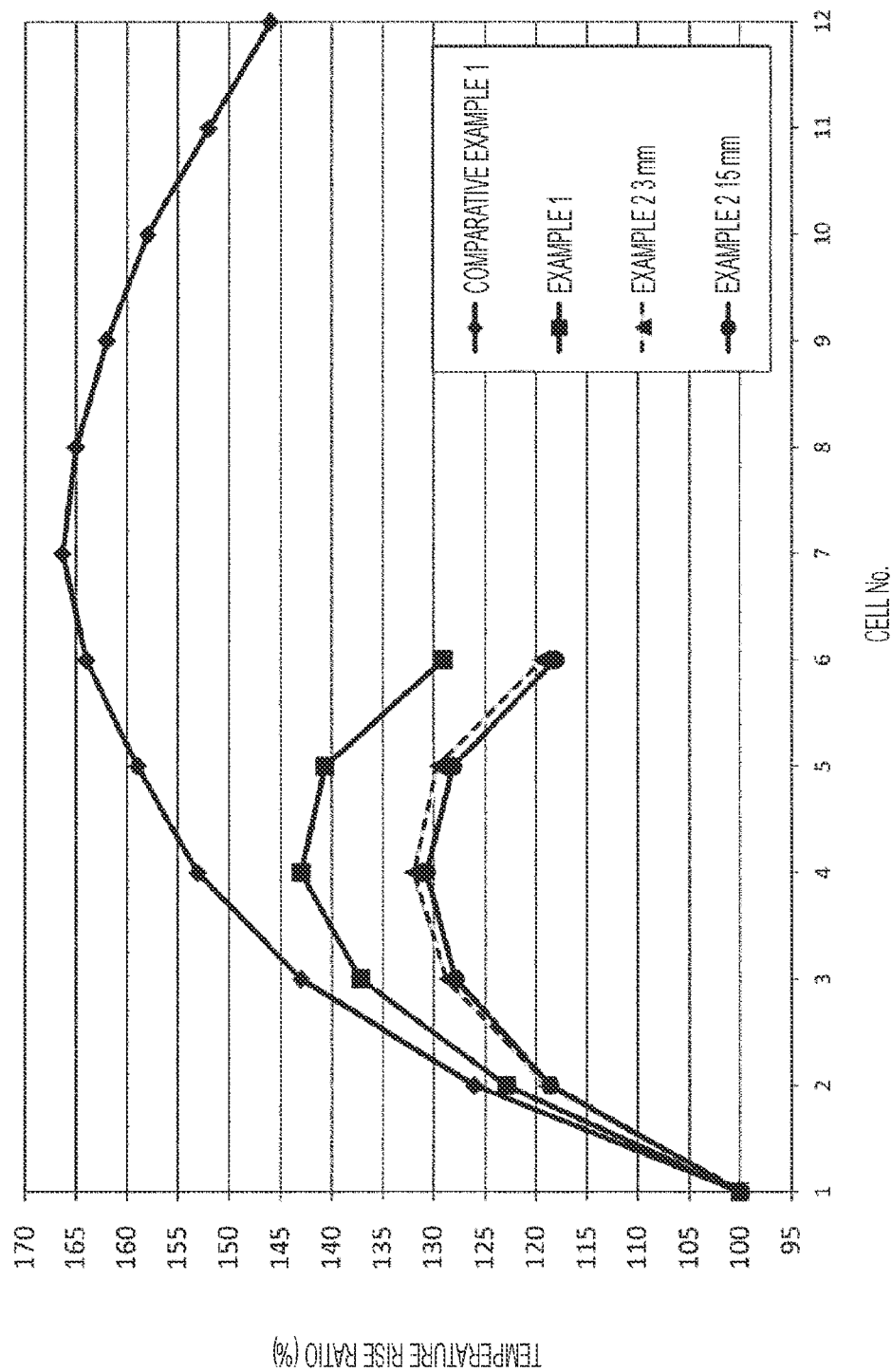
FIG. 8 is a temperature rise ratio chart representing a temperature rise of each unit cell of the configurations of Examples 1 and 2 and the conventional configuration from an environmental temperature, as a ratio from a lowest temperature in a battery group.

In addition, as a cooling condition, air at a wind speed of 5 m/sec was applied only to a bottom plate with a case in a lower portion of the battery group interposed therebetween. In FIG. 1, an upper surface of the case is shown. FIG. 8 shows the results when the state is almost normal, after applying the condition to the battery pack.

EXAMPLE 2

Subsequently, Example 2 is described. Example 2 is different from Example 1 in that after the first battery group and the second battery group were horizontally arranged, a heat transfer member 6 (heat conductive member) in a planar shape was interposed therebetween.

In FIG. 2, a structure of the present Example is shown. In the present Example, as described above, the heat transfer member 6 was disposed between the first battery group 10A and the second battery group 10B. The heat transfer member had two types, one having a thickness of 3 mm and the other having a thickness of 15 mm, and a temperature rise of the battery pack 100 was measured when each of the heat transfer members was used. The results are shown in FIG. 8. In addition, the cooling condition and the current application condition were identical to those of Example 1.

EXAMPLE 3

Subsequently, Example 3 is described. Example 3 is different from Example 1 in that as the material of the negative electrode current collector foil, an aluminum current collector foil was used instead of a copper foil.

Figure 9:
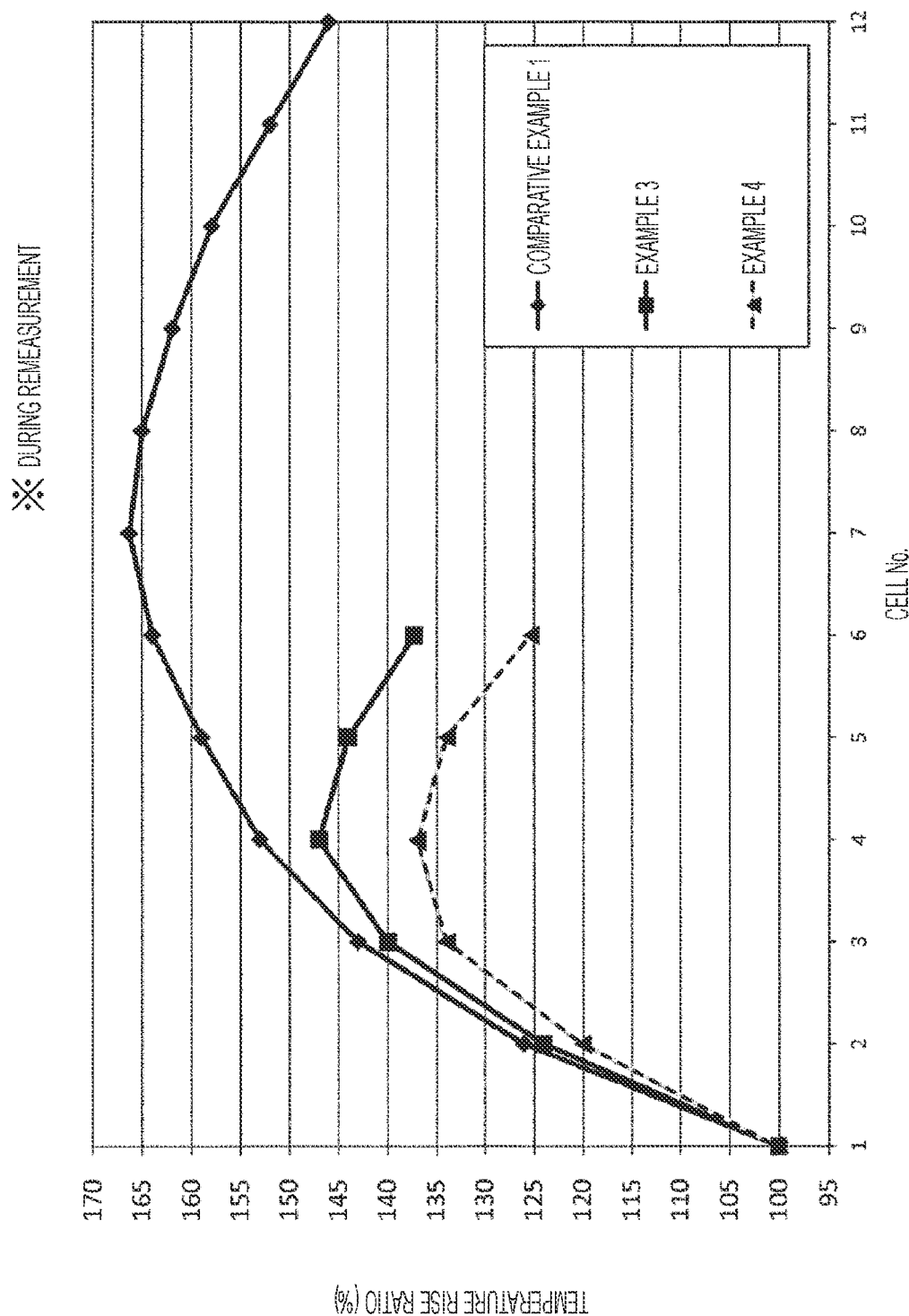
FIG. 9 is a temperature rise ratio chart representing a temperature rise of each unit cell of the configurations of Examples 3 and 4 and the conventional configuration from an environmental temperature, as a ratio from a lowest temperature in a battery group.

Since the detailed structure of the battery pack 100 is in the same arrangement as that of FIG. 1, the description thereof is omitted. The results of a temperature rise of the battery pack 100 are shown in FIG. 9. In addition, the cooling condition and the current application condition were identical to those of Example 1.

EXAMPLE 4

Subsequently, Example 4 is described. Example 4 is different from Example 2 in that as the material of the negative electrode current collector foil, an aluminum current collector foil was used instead of a copper foil. Since the detailed structure of the battery pack 100 is in the same arrangement as the arrangement of FIG. 2, the description thereof is omitted. In the present embodiment, as the heat transfer member 6, a member having a thickness of 15 mm is used. The results of a temperature rise of the battery pack 100 are described in FIG. 9. In addition, the cooling condition and the current application condition were identical to those of Example 1.

EXAMPLE 5

Subsequently, Example 5 is described. Example 5 is different from Example 1 in that the first battery group 10A and the second battery group 10B were vertically arranged as in FIG. 3 and a narrow side surface of the storage battery constituting the battery group was in contact with the bottom surface of the case 5 of the battery pack 100. The results of a temperature rise of the battery pack 100 are described in FIG. 10. In addition, the cooling condition and the current application condition were identical to those of Example 1.

EXAMPLE 6

Subsequently, Example 6 is described. Example 6 is different from Example 2 in that the first battery group and the second battery group were vertically arranged as in FIG. 4, and a narrow side surface of the storage battery constituting the battery group was in contact with the bottom surface of the case 5 of the battery pack 100.

Figure 10:
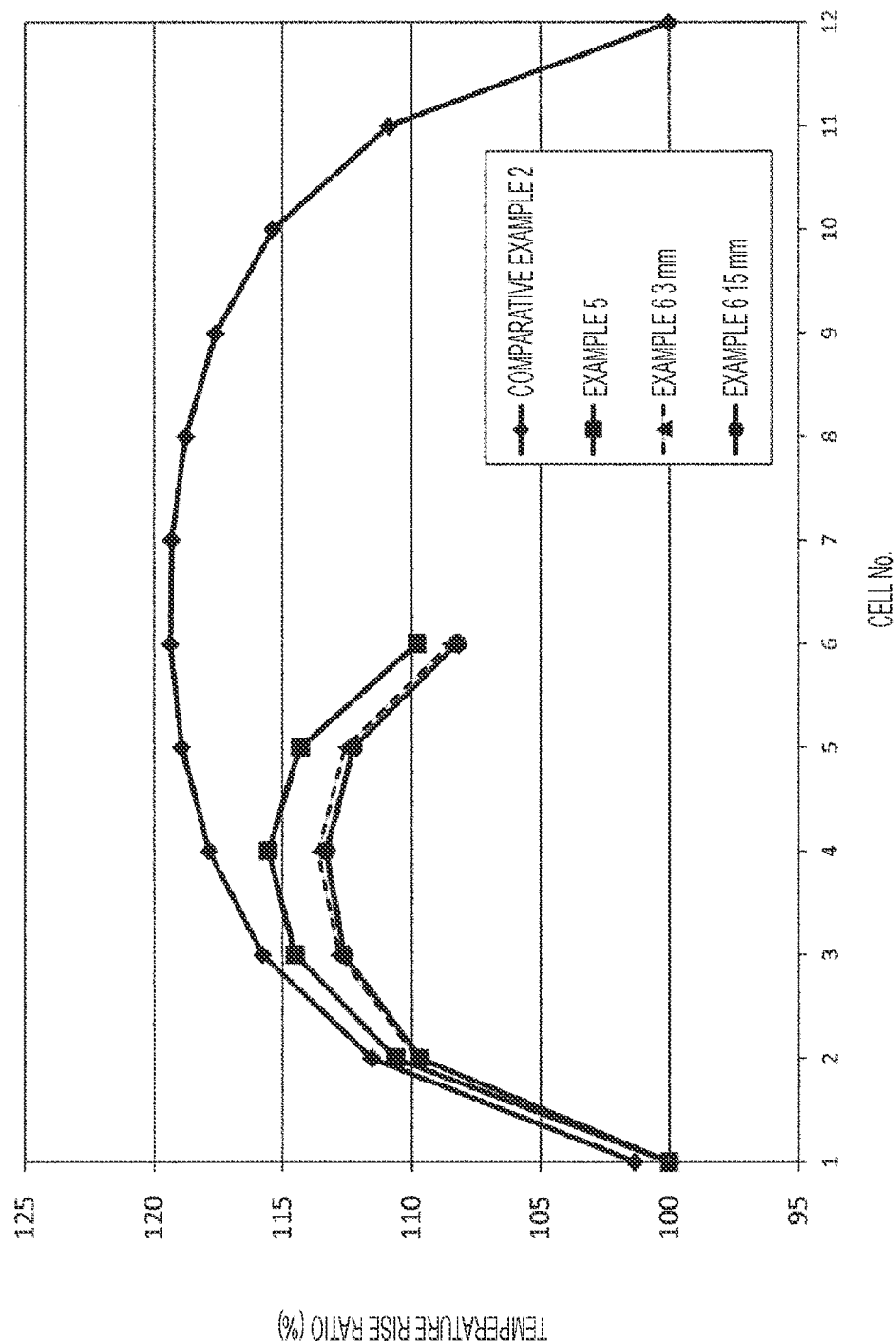
FIG. 10 is a temperature rise ratio chart representing a temperature rise of each unit cell of the configurations of Examples 5 and 6 and the conventional configuration from an environmental temperature, as a ratio from a lowest temperature in a battery group.

In addition, in the present Example, similarly to Example 2, the heat transfer member 6 had two types, one having a thickness of 3 mm and the other having a thickness of 15 mm, and each measurement results are shown in FIG. 10. In addition, the cooling condition and the current application condition were identical to those of Example 1.

EXAMPLE 7

Figure 11:
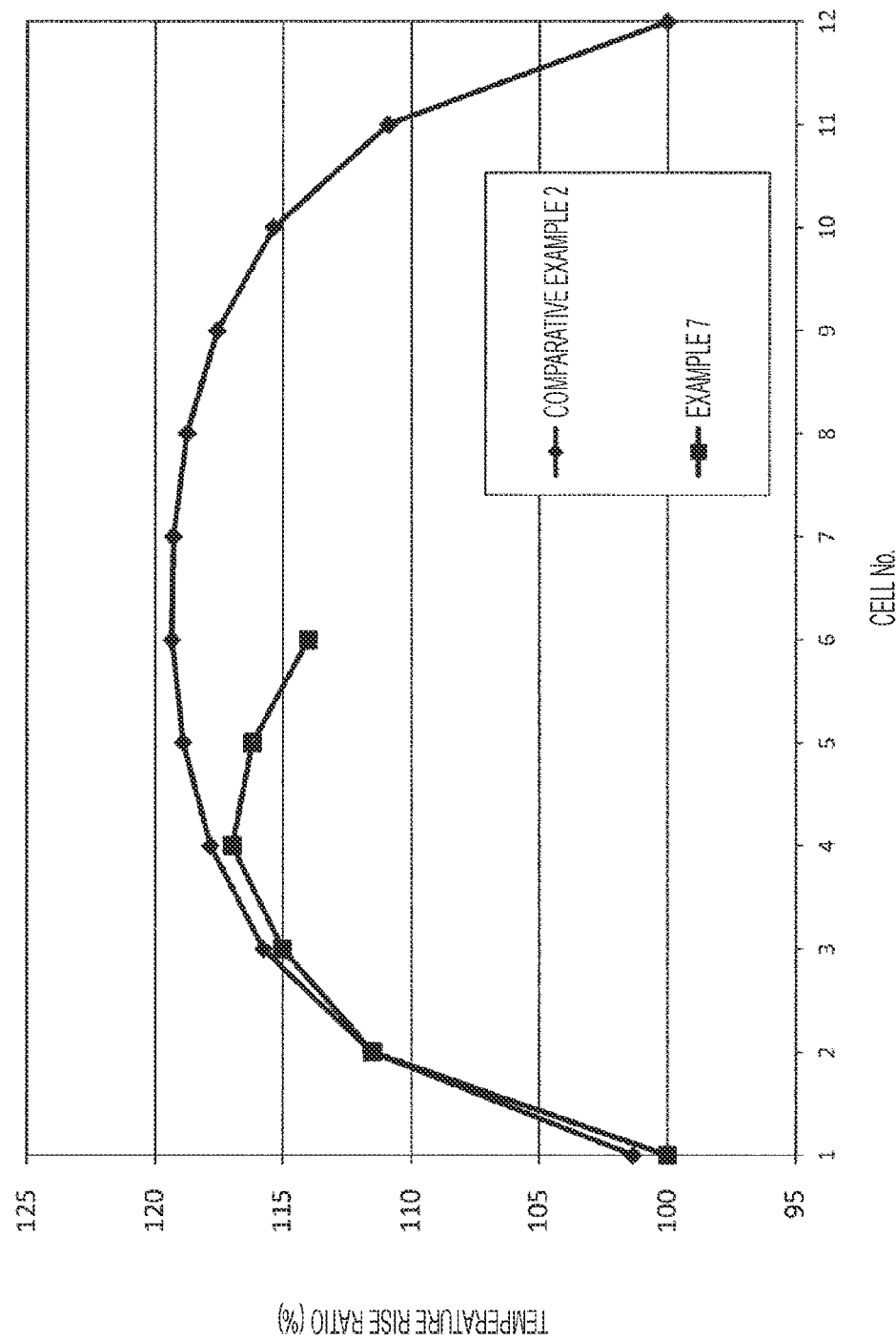
FIG. 11 is a temperature rise ratio chart representing a temperature rise of each unit cell of the configuration of Example 7 and the conventional configuration from an environmental temperature, as a ratio from a lowest temperature in a battery group.

Subsequently, Example 7 is described. Unlike Examples 1 to 6, the present Example has a structure in which the first battery group and the second battery group, each of which had 6 storage batteries 1 connected in series, were connected to each other in series, and the bottom surface of the storage battery 1 was in contact with the bottom surface 5*b* of the case of the battery pack 100. In addition, in the present embodiment also, the heat transfer member 6 was disposed between the first battery group 10A and the second battery group 10B. As the heat transfer member 6, an aluminum flat plate having a plate thickness of 15 mm was used. The results of a temperature rise of the battery pack 100 are shown in FIG. 11. In addition, the cooling condition and the current application condition were identical to those of Example 1.

COMPARATIVE EXAMPLE 1

Subsequently, Comparative Example 1 is described. Comparative Example 1 is different from Examples 1 to 7 in that the battery group is not divided into two and is laminated as a single battery group.

Figure 6:
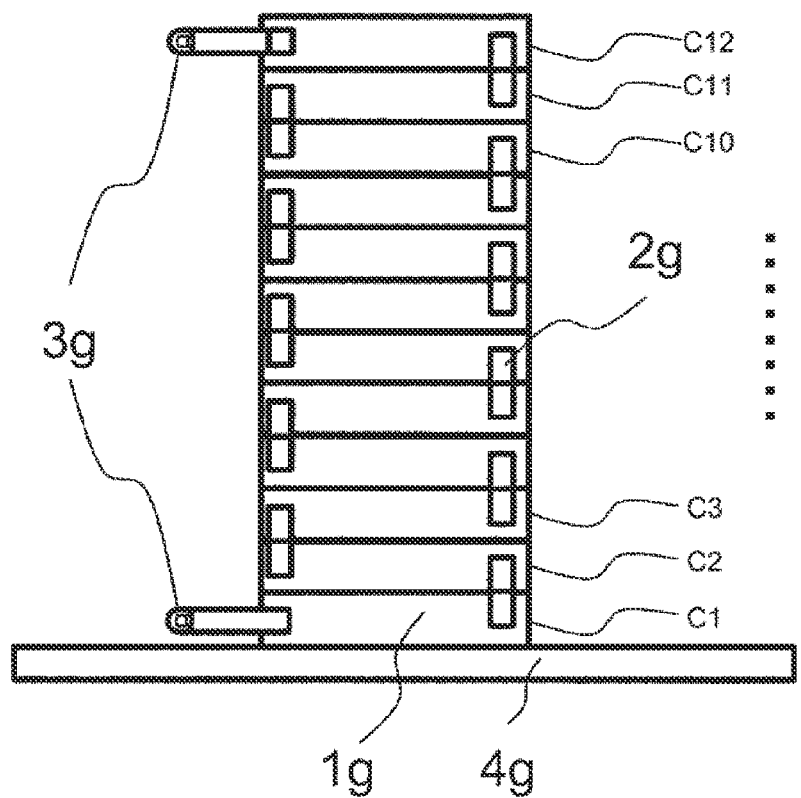
FIG. 6 is a drawing for describing an example of a specific configuration of a battery group in Comparative Example 1.

FIG. 6 is a drawing of the battery pack 100 of Comparative Example 1. Twelve batteries 1 were linked in series to form a single battery group, which was disposed so that the wide surface 1*a* of the unit cell 1 was in contact with the bottom surface 5*b* of the case 5. The results of a temperature rise of the battery pack 100 are shown in FIGS. 8 and 9. In addition, the cooling condition and the current application condition were identical to those of Example 1.

COMPARATIVE EXAMPLE 2

Subsequently, Comparative Example 2 is described. Comparative Example 2 is different from Examples 1 to 7 in that the battery group was not divided into two and laminated as a single battery group, and the narrow surface 1b of the unit cell 1 was in contact with the bottom surface 5b of the case 5.

Figure 7:
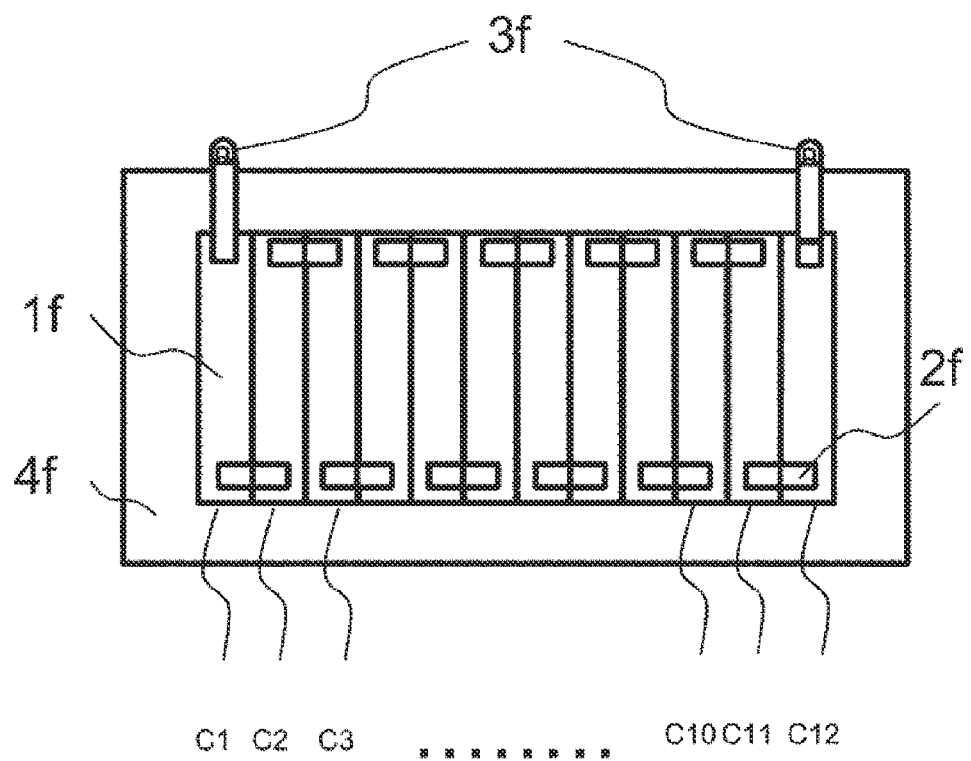
FIG. 7 is a drawing for describing an example of a specific configuration of a battery group in Comparative Example 2.

FIG. 7 is a drawing of the battery pack 100 of Comparative Example 2. Twelve batteries were linked in series to form a single battery group, which was disposed so that the narrow surface 1b of the unit cell 1 was in contact with the bottom surface 5b of the case 5. The results of a temperature rise of the battery pack 100 are shown in FIGS. 10 and 11. In addition, the cooling condition and the current application condition were identical to those of Example 1. Hereinafter, the effects of the present patent application will be described based on the results of the Examples and the Comparative Examples.

As a result of imparting the conditions represented in the present Examples and the Comparative Examples to the battery group, when the temperature of the battery group reaches an almost steady state, the battery temperature was raised as compared with the environmental temperature. FIGS. 8 to 11 are drawings which show a ratio of a rising temperature of each unit cell of the battery group compared with an environmental temperature to a rising temperature of the unit cell having the smallest temperature rise, for each cell. In the drawings, the cell No. corresponds to the cell No. described in the drawing corresponding to each Example or Comparative Example. Here, for two battery groups in the Examples, the unit cells present in the place where the battery groups face each other had almost the same temperature, and the description thereof is omitted for simplicity. Hereinafter, the result of each drawing will be described in detail.

FIG. 8 shows a temperature rise ratio of the configurations of Examples 1 and 2, which are examples of applying the present invention to the battery arrangement which is horizontally arranged as in Comparative Example 1. It can be seen from the drawing that in the Comparative Example as the conventional configuration, the temperature of cell No. 7, which is disposed at a center of the laminate of a battery, was highest. This is because in the battery near cell No. 7, heat quantity produced from the surrounding battery was not dissipated to raise the temperature of the surrounding battery as well as the temperature of the battery itself, and thus, there was no temperature difference to make heat difficult to flow, resulting in a battery temperature rise. Meanwhile, the unit cell of cell No. 1 in contact with the case bottom surface and the battery of cell No. 12 having the external terminal had a heat dissipation path to suppress a temperature rise. From the results, since there occurred a difference in the temperature rise between cell No. 1 and No. 12 and cell No. 7, the temperature rise ratio was greatly changed in the same battery group in Comparative Example 1. Therefore, it can be seen that the temperature difference between the unit cells easily occurred in Comparative Example 1.

Meanwhile, FIG. 8 shows the example of the present invention. It can be seen that the present invention can reduce the temperature rise rate in the entire cells as compared with the Comparative Example, from the comparison of the temperature rise rates of the batteries in the entire cells present in the same arrangement. In addition, as shown in Example 2, it can be seen that the effect was further exhibited by disposing the heat transfer member between the battery groups, thereby reducing the temperature difference between the batteries. This means that the heat dissipation path was effectively secured by disposing the external terminal in cell No. 6 which had the highest temperature. Additionally, it can be seen that in Example 2, an Al plate was introduced to secure the heat dissipation path, and thus, the rising temperature difference between batteries could be effectively reduced.

FIG. 9 shows the temperature rise rates of the configurations of Examples 3 and 4 which are examples of applying the present invention to the battery configuration which was horizontally arranged as in Comparative Example 1. It can be seen from the drawings that when the negative electrode current collector foil was Al also, the temperature difference between batteries tended to be reduced as illustrated in FIG. 8. Heat behavior which occurred in FIG. 9 is due to the same phenomenon as that occurred in FIG. 8.

FIG. 10 shows the configurations of Examples 5 and 6 which are examples of applying the present invention to the battery configuration which was vertically arranged as in Comparative Example 2. It can be seen from the drawing that in the Comparative Example as the conventional configuration, the temperature of cell No. 6 which is at the center of the laminate of the battery was highest. The temperature rise occurred here is due to the same phenomenon as that in the Comparative Example 1 shown in FIG. 8.

In addition, it can be seen from the drawing that in the case of vertical arrangement also, the temperature difference between batteries was reduced like FIGS. 8 and 9. Even in the case of the vertical arrangement not the horizontal arrangement, the temperature near the center of the long side tended to be raised. It can be seen that by disposing the external terminal in the portion, the same effect as that in FIGS. 8 and 9 was obtained and the rising temperature difference could be reduced.

In FIG. 11, the temperature difference of the case of applying the present invention to the configuration shown in Example 7 is compared with the battery configuration of the vertical arrangement like Comparative Example 2. It can be seen from the drawing that the present invention also tended to reduce the temperature difference. It can be seen that it is because in Example 7 also, the external terminal was installed in cell No. 6 which has the highest battery temperature, thereby effectively dissipating heat to the outside of the battery group.

The battery pack described in the present invention includes a first battery group (10A) in which a plurality of storage batteries (1) having a battery can side surface (1a, 1b) and a battery can bottom surface (1c) linked to the battery can side surface (1a, 1b) are laminated so that the battery can side surfaces (1a, 1b) face each other; a second battery group (10B) in which a plurality of storage batteries (1) having a battery can side surface (1a, 1b) and a battery can bottom surface (1c) linked to the battery can side surface (1a, 1b) are laminated so that the battery can side surfaces (1a, 1b) face each other; and a case (5) housing the first battery group (10A) and the second battery group (10B), wherein facing surfaces of the first battery group (10A) and the second battery group (10B) are directly or indirectly thermally connected to each other. By having this structure, a battery pack having a decreased temperature difference between the battery groups can be provided.

In addition, the present invention has a structure in which wide surfaces (1a) of the two battery groups face the bottom surface of the case (5). By having this structure, a cooling area is increased to improve cooling performance as compared with the case in which the narrow surface 1b is in contact with the case 5.

In addition, in the battery pack described in the present invention, when the wide surface 1a of the battery 1 faces downward, the external terminal 3 is at the center side of the battery pack, thereby cooling the center side of the battery pack which is more difficult to dissipate heat through the external terminal. Thus, the heat dissipation properties are further improved, thereby making it possible to provide a battery pack having a decreased temperature difference between the battery groups.

Figure 12:
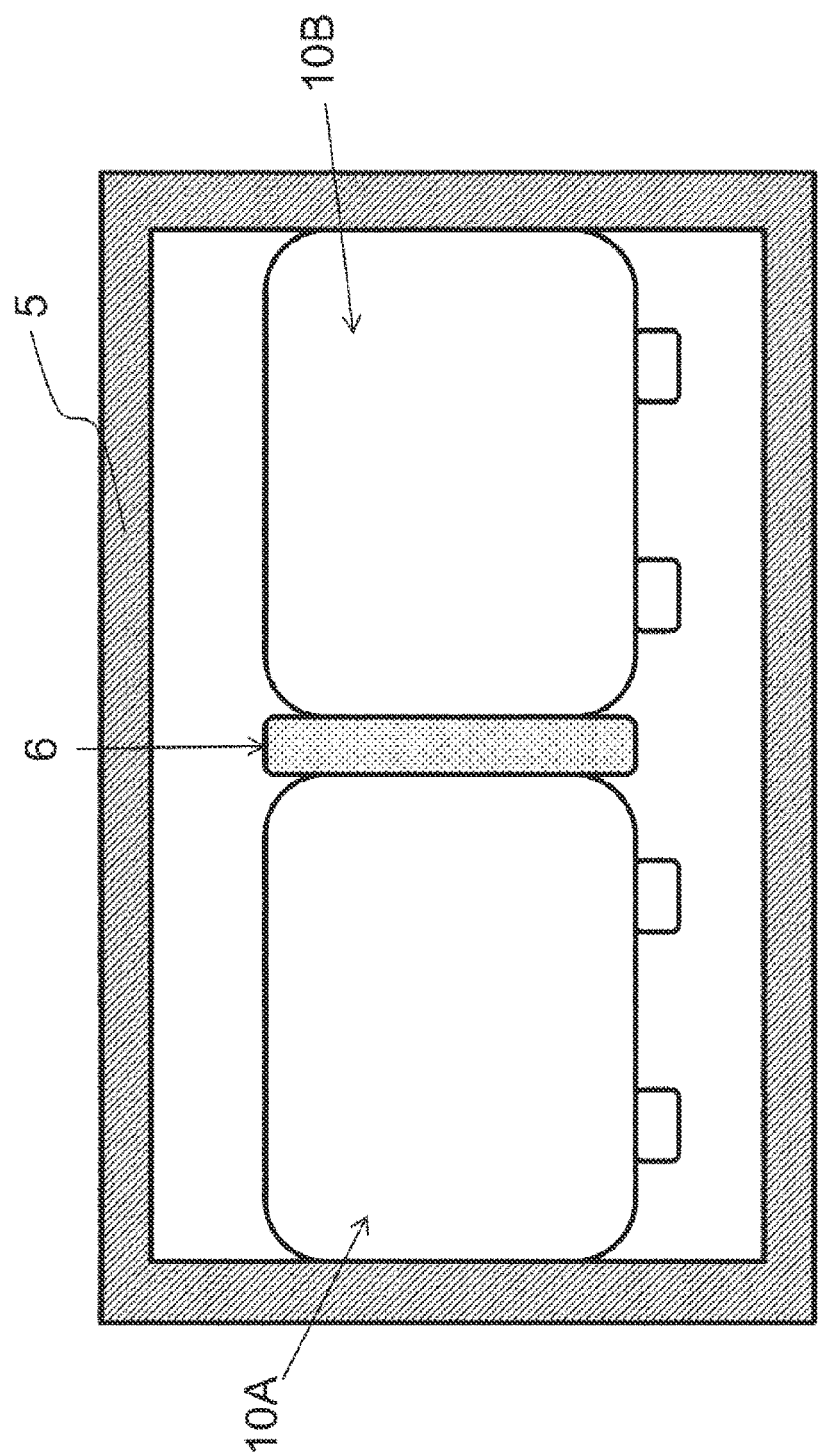
FIG. 12 is a drawing in which the battery pack of FIG. 2 is viewed from an upper surface.

In addition, as shown in FIG. 12, in the battery pack described in the present invention, the first heat transfer member (6) is disposed between the first battery group (10A) and the second battery group (10B), and the heat transfer member (6) is closely adhered to the first battery group (10A) and the second battery group (10B). By having this structure, thermal diffusion is further promoted by the heat transfer member, thereby providing a battery pack having a decreased temperature difference between the battery groups. In addition, FIG. 12 is a drawing in which FIG. 2 is viewed from the upper surface.

Figure 13:
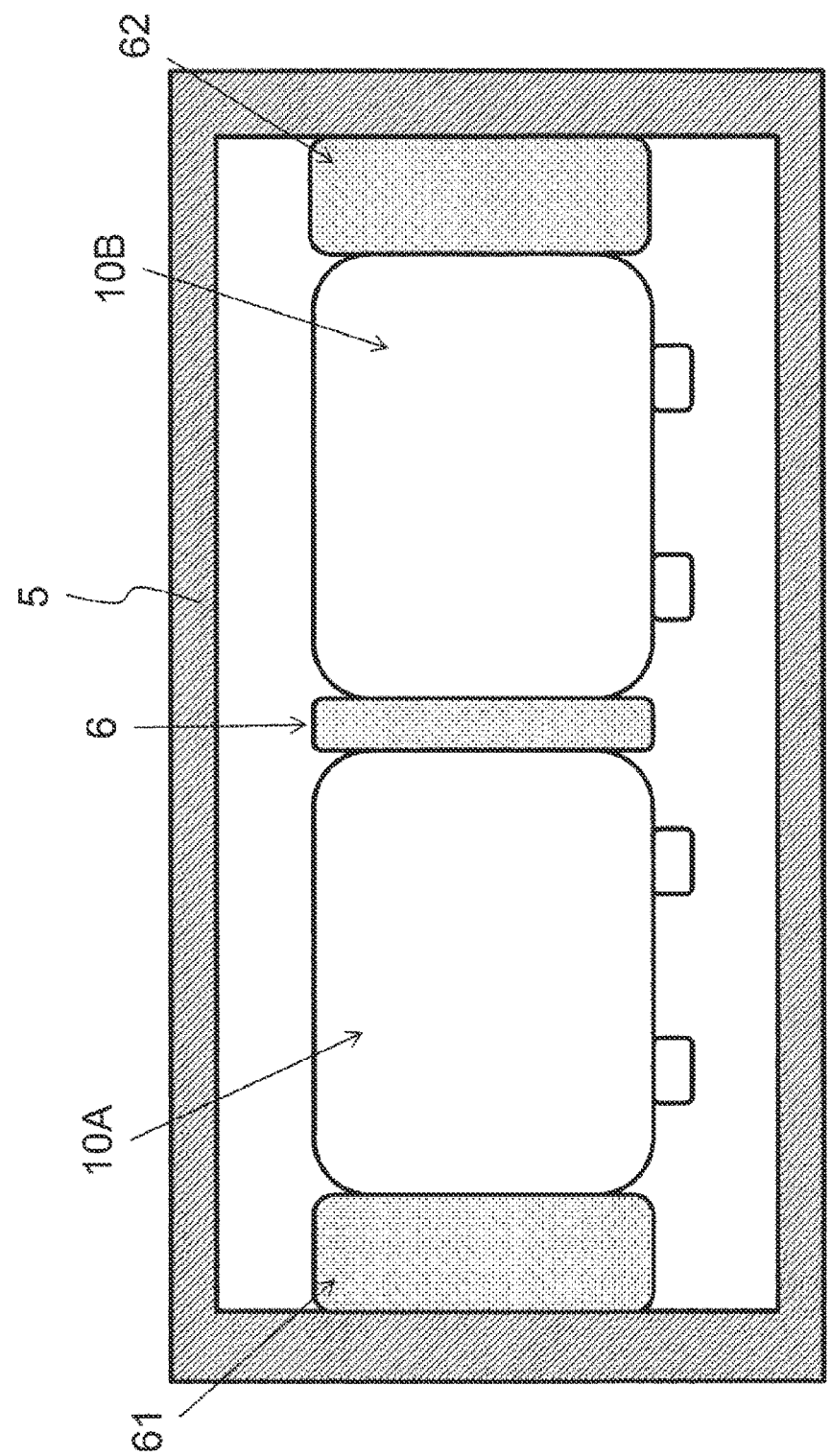
FIG. 13 is a first modified example of FIG. 12.

In addition, in the battery pack described in the present invention, as shown in FIG. 13, the second heat transfer member 61 and the third heat transfer member 62 may be disposed on both sides of the first battery group 10A and the second battery group 10B. In this case, the first battery group 10A is sandwiched between the heat transfer member 6 and the second heat transfer member 61, and the second battery group 10B is sandwiched between the heat transfer member 6 and the third heat transfer member 10B, so that the heat dissipation properties are improved also on both sides of the battery groups 10A and 10B, thereby providing a battery pack having a further decreased temperature difference between the battery groups.

In addition, the battery pack described in the present invention has a structure in which for both of the second heat transfer member 61 and the third heat transfer member 62, those having a larger width, that is, a larger thickness than the first heat transfer member 6 are used. By having this structure, the structure becomes large so that the case 5 and the heat transfer members 61 and 62 can be fixed with a screw and the like, so that the case 5 and the heat transfer members 61 and 62 can be more closely adhered. Thus, it becomes easy to transfer heat of the battery 1 to the case 5, thereby providing a battery pack having improved cooling performance.

Figure 14:
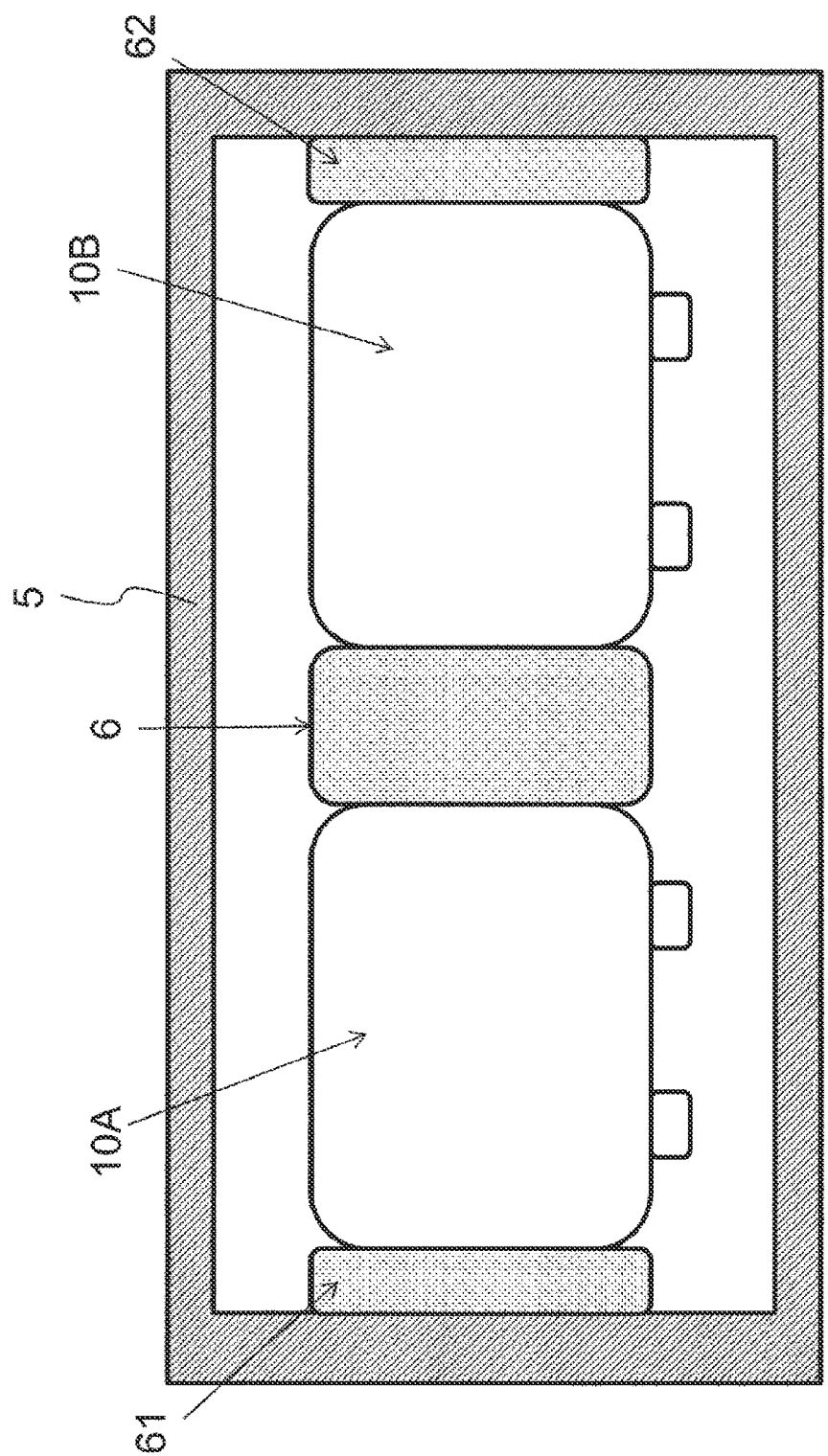
FIG. 14 is a second modified example of FIG. 12.

In addition, in the battery pack described in the present invention, as another form different from that as shown in FIG. 14, the first heat transfer member 6 has a larger thickness than the second heat transfer member 61 and the third heat transfer member 62. By having this structure, thermal diffusion between the two battery groups having the worst heat dissipation properties is further promoted, thereby providing a battery pack having improved cooling performance. In addition, in the present invention, the battery pack type of contacting the wide surface 1a of the battery 1 as described above with the bottom surface of the case 5 exerts the effect very much when it is used for natural cooling like the case in which cooling air is not flowed between the battery groups or the unit cells. Therefore, the present invention is very appropriate for a structure in which the battery 1 is horizontally arranged.

As described above, the embodiments of the present invention have been described in detail; however, the present invention is not limited to the above embodiments, and various design modifications can be made within the range not departing from the spirit of the present invention described in the claims. For example, the foregoing embodiments have been described in detail for better understanding of the present invention, and are not necessarily limited to those having all of the configuration described above. In addition, some of the configurations of any embodiment can be replaced with the configurations of another embodiment, and to the configurations of any embodiment, the configurations of another embodiment can be added. In addition, some of the configurations of each embodiment can be deleted or substituted, or other configuration can be added thereto.

The following content of disclosure of priority basic application is incorporated herein as a cited reference.

Japanese Patent Application No. 2017-064157 (filed on Mar. 29, 2017).

REFERENCE SIGNS LIST 1 unit cell
2 wiring
3 external terminal
5 case
6, 61, 62 heat transfer member

The invention claimed is:
1. A battery pack comprising:
a first battery group and a second battery group placed in a case housing, each of the first battery group and the second battery group being arranged so that a plurality of storage batteries, each of which is formed in a cuboid including a pair of wide surfaces and a plurality of narrow surfaces, are placed to make the wide surfaces face each other and are physically bound together;
a bus bar for connecting the first battery group and the second battery group together; and
a first heat transfer member configured as a solid flat plate,
wherein the narrow surfaces other than the pair of wide surfaces include:
a first narrow surface with an external terminal,
a second narrow surface opposite the first narrow surface; and
a third narrow surface as a side face other than the first narrow surface and the second narrow surface;
wherein the first battery group and the second battery group are disposed in the case housing such that the third narrow surface of the first battery group and the third narrow surface of the second battery group face each other via the first heat transfer member; and
wherein an additional terminal for connecting each of the first battery group and the second battery group with equipment outside the storage batteries is provided separately from the external terminal.
2. The battery pack according to claim 1,
wherein each of the first battery group and the second battery group is formed by laminating the plurality of storage batteries to cause the wide surfaces of the storage batteries to face each other.
3. The battery pack according to claim 2,
wherein a surface of the case housing on which the first battery group and the second battery group are respectively laminated in the vertical direction is defined as a bottom face, and the first battery group and the second battery group are housed in the case housing so that the respective wide surfaces of the first battery group and the second battery group are placed to face the bottom face.

4. The battery pack according to claim 1, wherein the additional terminal is provided at a central part of the battery pack.

5. The battery pack according to claim 3, wherein the additional terminal is provided at a central part of the battery pack, and wherein the storage battery placed on top of each of the first battery group and the second battery group is provided with the additional terminal.

6. The battery pack according to claim 1, further comprising:

a second heat transfer member; and a third heat transfer member.

7. The battery pack according to claim 6, wherein the second heat transfer member is disposed in contact with the first battery group and a first inner surface of the case, and the third heat transfer member is disposed in contact with the second battery group and a second inner surface of the case that faces the first inner surface.

\* \* \* \* \*